W. SCHUMACHER.
METHOD OF OBTAINING GRANULAR SLAG.
APPLICATION FILED MAR. 29, 1912.
1,416,069. Patented May 16, 1922.
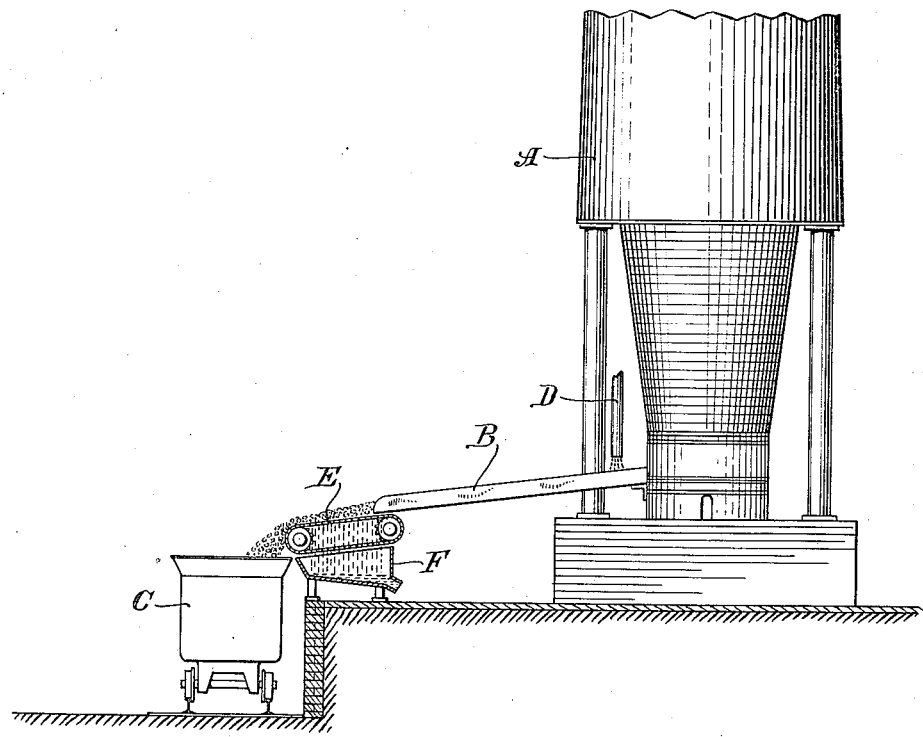
WITNESSES
G. V. Rasmussen
N. H. Lockwood
INVENTOR
WILHELM SCHUMACHER
BY
Bieser Knauth
ATTORNEYS

UNITED STATES PATENT OFFICE.

WILHELM SCHUMACHER, OF OSNABRUCK, GERMANY.

METHOD OF OBTAINING GRANULAR SLAG.

1,416,069.  Specification of Letters Patent.  Patented May 16, 1922.

Application filed March 29, 1912. Serial No. 687,182.

(GRANTED UNDER THE PROVISIONS OF THE ACT OF MARCH 3, 1921, 41 STAT. L., 1313.)

*To all whom it may concern:*

Be it known that I, WILHELM SCHUMACHER, chemist, and a subject of the King of Prussia, residing at Osnabruck, in the Kingdom of Prussia, German Empire, have invented certain new and useful Improvements in Methods of Obtaining Granular Slag, of which the following is a specification.

My object is to obtain furnace slag such as is capable of use in the manufacture of artificial stone from slag according, for instance, to the method described in my Patent No. 977,681 of December 6, 1910.

Blast furnace slag is usually granulated by the method of Lürmann which consists in bringing a large quantity of water into contact with the molten slag as it runs from the furnace. In this method the usual treatment is to permit the water and the granulated slag to run down the chute together and drop into a car or other receptacle where the granulated water-soaked slag becomes thoroughly cooled. By this treatment the particles of granulated slag become more or less impregnated with water for it is well understood that in this process of sudden cooling of the slag to form the granular particles, the particles are subjected to very great internal tensional strains, and as they cool down in the water, the outer more or less glassy casing of each slag granule becomes cracked and covered with minute fissures. The internal structure of the slag is porous, that is, each granule is filled with a large number of small bubbles in fissures of capillary dimensions which are filled with gases and vapors at the time the slag comes from the furnace and is granulated by treatment with the water; hence when these granular particles cool off in the water and their outer surface becomes cracked and fissured, the gases in the capillary cells and bubbles within the granules are condensed and absorbed by the water leaving a vacuum or partial vacuum into which the water is sucked. The amount of water thus taken up by the slag is in the neighborhood of 40% by weight of the entire slag.

To drive off or eliminate this water even when the granular slag is carefully crushed and then subjected to high drying temperatures for an extended time is highly uneconomical and in fact it seems to be practically impossible to drive out the water which has been drawn into numerous capillary crevices and cavities in the particles of granulated slag.

In using such granular slag in the production of artificial stone, I have found that this excess of water is detrimental, since the slag, in order to be incorporated into an artificial stone should not contain more than 10% of water. More water than 10% means that the mass is not compressible, i. e., it will not hold together. In order to obtain granular slag having the required low proportion of water contents, I have devised the method herein described whereby the granular slag and the water are separated before the granular slag is cooled off and before it reaches the receptacle. In fact, particles of slag are still red-hot when the water is separated therefrom, and hence the particles of water adhering to the slag granules will be quickly evaporated and the slag, when it reaches the receptacle will be practically dry.

Any suitable or preferred method of carrying out my invention may be used and for the purpose of illustrating one method of separating the water from the slag, I have shown diagrammatically in the accompanying drawing an endless belt or screen near the end of the chute down which the water and granulated slag passes to the receptacle. In the drawings A represents the blast furnace which may be of any well known or usual construction; B represents the slag chute leading from the blast furnace to the car C or other receptacle for receiving the granulated slag. The water is precipitated on to the molten slag as it comes from the furnace in any suitable way as by the pipe D which may be connected to the water supply in any suitable manner (not shown). Near the end of the chute B, I have illustrated in the present instance an endless conveyor chain E of well known construction which may be composed of links or bars adapted to produce a screen having a suitable mesh to permit the water to flow through, but which will retain the granular slag particles, and transport them to the receptacle C. The water and granular slag rush down the chute B together until they reach the screen or conveyor chain E when the water will separate itself from the slag and drop through the screen and run off by the passage F. The granular slag particles, still red-hot, will be carried along on the endless chain screen E and be dumped into the car or receptacle C.

By this method of separating the water from the granular slag particles before they are cooled, I find that I obtain what may, for the purposes of this art, be termed a dry granular slag, which, when used in the formation of artificial stone I find to give vastly better results than are obtained by the use of granular slag produced in the usual way.

In carrying out my method I do not wish to be limited to the particular mechanism shown, but wish to cover any device adapted for the purpose within the scope of the claims.

What I claim is:

1. The herein described method of producing a substantially water-free, granular slag, which consists in subjecting the surface of a stream of molten slag as it discharges from the furnace, to the cooling action of water and separating the water from the slag while the latter still retains sufficient heat to reject the water and before the slag becomes cool enough to permit water to exist in liquid form adjacent to its surfaces, thus preventing water from at any time penetrating into the pores of the slag.

2. The herein described method of producing a substantially water-free, granular slag, which consists in subjecting the surface of a stream of molten slag as it discharges from the furnace to the cooling action of water, separating the water from the slag while the latter still retains sufficient heat to reject the water and before the slag becomes cool enough to permit water to exist in liquid form adjacent to its surfaces, thus preventing water from at any time penetrating into the pores of the slag, and then passing the separated hot slag into a suitable receptacle for further cooling.

In witness whereof I have hereunto set my hand in the presence of two subscribing witnesses.

WILHELM SCHUMACHER.

Witnesses:
  M. H. LOCKWOOD,
  JOHN AKEHLENBECK.